United States Patent
Kaneko et al.

(10) Patent No.: US 10,705,305 B2
(45) Date of Patent: Jul. 7, 2020

(54) OPTICAL FIBER UNIT AND OPTICAL FIBER CABLE

(71) Applicant: FUJIKURA LTD., Tokyo (JP)

(72) Inventors: Soichiro Kaneko, Sakura (JP); Tomoaki Kaji, Sakura (JP); Mizuki Isaji, Sakura (JP); Kouji Tomikawa, Sakura (JP); Ken Osato, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 16/334,046

(22) PCT Filed: Sep. 8, 2017

(86) PCT No.: PCT/JP2017/032471
§ 371 (c)(1),
(2) Date: Mar. 18, 2019

(87) PCT Pub. No.: WO2018/056078
PCT Pub. Date: Mar. 29, 2018

(65) Prior Publication Data
US 2019/0271822 A1 Sep. 5, 2019

(30) Foreign Application Priority Data
Sep. 20, 2016 (JP) .................. 2016-183491

(51) Int. Cl.
*G02B 6/44* (2006.01)
*G02B 6/04* (2006.01)

(52) U.S. Cl.
CPC .............. *G02B 6/441* (2013.01); *G02B 6/04* (2013.01); *G02B 6/44* (2013.01)

(58) Field of Classification Search
CPC ............. G02B 6/441; G02B 6/04; G02B 6/44
See application file for complete search history.

(56) References Cited

U.S. PATENT DOCUMENTS

| | | |
|---|---|---|
| 5,165,003 A | 11/1992 | Carter |
| 6,193,824 B1 | 2/2001 | Einsle et al. |
| 2003/0091307 A1 | 5/2003 | Hurley et al. |

(Continued)

FOREIGN PATENT DOCUMENTS

| | | |
|---|---|---|
| CN | 1159592 A | 9/1997 |
| CN | 105612443 A | 5/2016 |

(Continued)

OTHER PUBLICATIONS

Machine translation of WO-2015053146-A1 (Year: 2015).*

(Continued)

*Primary Examiner* — Ryan A Lepisto
(74) *Attorney, Agent, or Firm* — Osha Liang LLP

(57) ABSTRACT

An optical fiber unit includes: a plurality of optical fibers; and at least two binding materials that bind the plurality of optical fibers. The two binding materials are wound around the plurality of optical fibers in an SZ shape and adhered to each other at reversed portions of the SZ shape to form an adhesive part. The adhesive part extends along a longitudinal direction where the optical fiber unit extends, and $0.15 \leq L/(P/2) \leq 0.8$ is satisfied where L is a length of the adhesive part in the longitudinal direction and P is a binding pitch of the two binding materials in the longitudinal direction.

4 Claims, 6 Drawing Sheets

(56) References Cited

U.S. PATENT DOCUMENTS

2016/0223769 A1 8/2016 Ito et al.
2017/0153403 A1 6/2017 Trott

FOREIGN PATENT DOCUMENTS

| | | |
|---|---|---|
| EP | 3056932 A1 | 8/2016 |
| JP | 2010-026196 A | 2/2010 |
| JP | 2012-088454 A | 5/2012 |
| JP | 5777998 B2 | 9/2015 |
| TW | 201142400 A | 12/2011 |
| TW | 201523054 A | 6/2015 |
| WO | 2015/052951 A1 | 4/2015 |
| WO | 2015/053146 A1 | 4/2015 |
| WO | WO-2015053146 A1 * | 4/2015 |

OTHER PUBLICATIONS

Office Action issued in counterpart Japanese Patent Application No. 2016-183491, dated Oct. 24, 2017 (4 pages).
Notice of Allowane issued in counterpart Japanese Patent Application No. 2016-183491, dated Feb. 6, 2018 (3 pages).
Office Action issued in counterpart Taiwanese Patent Application No. 106131565, dated May 17, 2018 (6 pages).

* cited by examiner

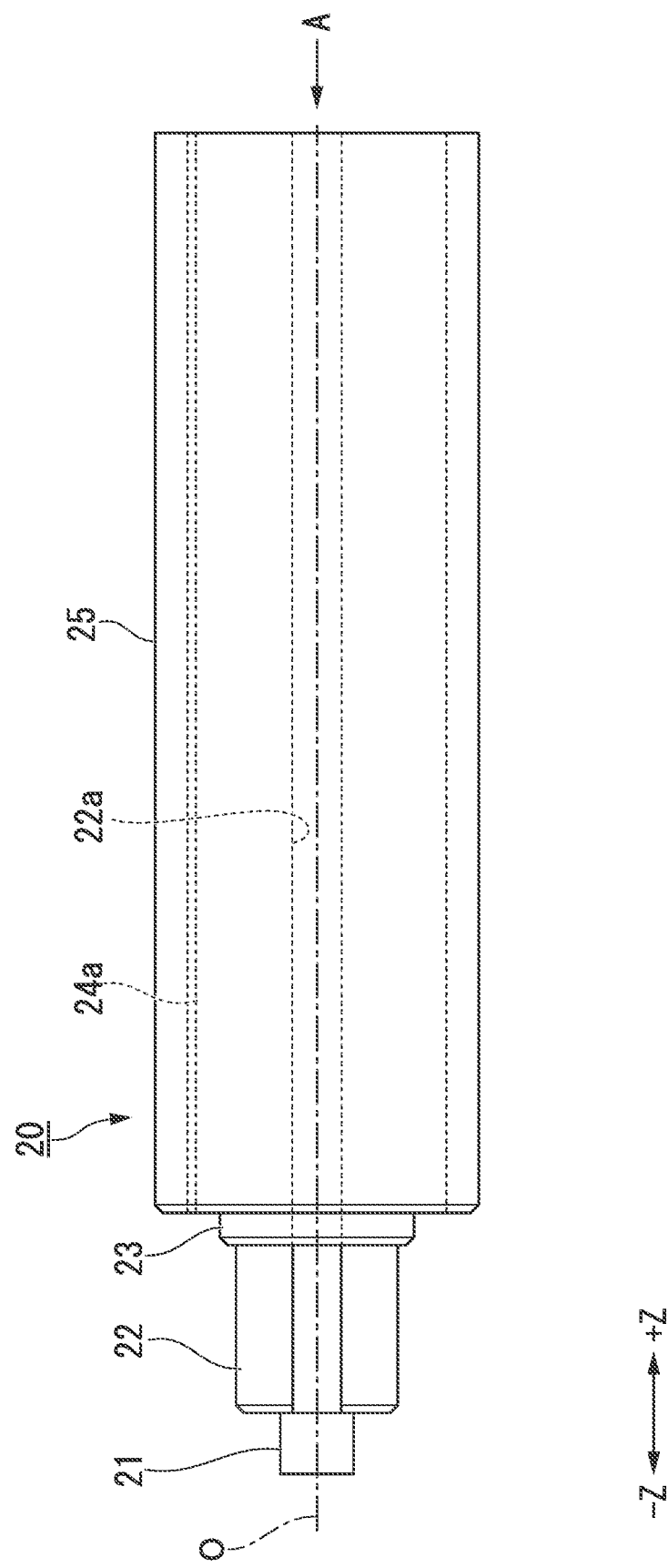

OPTICAL FIBER UNIT AND OPTICAL FIBER CABLE

TECHNICAL FIELD

The present invention relates to an optical fiber unit and an optical fiber cable.

This application claims priority from Japanese Patent Application No. 2016-filed on Sep. 20, 2016, and incorporated herein by reference in its entirety.

BACKGROUND

In the related art, as disclosed in Patent Document 1, an optical fiber unit formed by winding binding materials on a plurality of optical fiber cores or optical fiber strands (hereinafter, simply referred to as optical fibers). In the optical fiber unit, binding materials are wound, so it is possible to prevent the bundle of optical fibers from becoming loose, and it is also possible to improve the discrimination among the plurality of optical fiber units depending on the colors of binding materials.

In addition, Patent Document 2 proposes an optical fiber unit in which a plurality of binding materials are wound in an SZ shape on a bundle of optical fibers, and two binding materials are adhered to each other at reversed portions in the winding direction. According to this configuration, when the part at which the two binding materials are adhered to each other is peeled off, the binding around the peeled part is released and the binding at the other part is maintained. Thus, it is possible to improve workability of intermediate post-branching or the like of the optical fiber unit.

[Patent Document 1] Japanese Unexamined Patent Application, First Publication No. 2010-26196

[Patent Document 2] Japanese Unexamined Patent Application, First Publication No. 2012-88454

In the optical fiber unit described in Patent Document 2, since binding materials are adhered to each other at reversed portions, the adhesive part could be unexpectedly peeled off, so that the binding state tends to become unstable.

SUMMARY

One or more embodiments of the present invention stabilize the binding state of the binding material wound in an SZ shape on a plurality of optical fibers.

An optical fiber unit according to one or more embodiments of the present invention includes a plurality of optical fibers, and at least two binding materials that bind the plurality of optical fibers, in which the two binding materials are wound around the plurality of optical fibers in an SZ shape, and are adhered to each other at respective reversed portions to form an adhesive part, the adhesive part extends along a longitudinal direction in which the optical fiber unit extends, and when the length of the adhesive part in the longitudinal direction is L, and a binding pitch of the binding material in the longitudinal direction is P, $0.15 \leq L/(P/2) \leq 0.8$ is satisfied.

According to the optical fiber unit of one or more embodiments, since the value of $L/(P/2)$ is 0.15 or more, the area of the adhesive part occupied in the entire binding material is secured, and thus it is possible to prevent the adhesive part from being unexpectedly peeled off. Further, since the value of $L/(P/2)$ is set to 0.8 or less, when manufacturing the optical fiber unit, it is possible to prevent the occurrence of an adhesion failure caused by a short distance in the longitudinal direction or short time from the formation of the adhesive part to the inversion of the binding materials.

As described above, according to the optical fiber unit of one or more embodiments, it is possible to stabilize a binding state.

In one or more embodiments, a center line of the binding material has a linear portion extending along the longitudinal direction, and the linear portion is included in the adhesive part.

According to one or more embodiments, for example, as compared to the case where the center line of the binding material does not have a linear portion, the area of the adhesive part is larger, and it is possible to more reliably form the adhesive part.

In one or more embodiments, the linear portions of the center lines of the two binding materials overlap each other at the adhesive part.

According to one or more embodiments, the area of the adhesive part is larger, and it is possible to more reliably adhere the binding materials with each other.

In one or more embodiments, the center lines of the two binding materials intersect each other at the reversed portions to form a plurality of intersection points.

According to one or more embodiments, since the center lines of the binding materials form a plurality of intersection points, adhesive parts are formed around the intersection points. This allows two binding materials to overlap each other in a sufficient range, for example, even in a case where there is a variation in the position where the binding material is reversed or the shape of the reversed portion. Therefore, the adhesive part is reliably formed, so it is possible to stabilize a binding state of the binding material.

In one or more embodiments, an adhesive strength of the adhesive part is 12.5 gf or more and 91.0 gf or less.

According to one or more embodiments, it is possible to prevent the adhesive part from being unexpectedly peeled off, by setting the adhesive strength of the adhesive part to 12.5 gf or more, and it is possible to improve the workability in peeling the binding materials at the adhesive part, by setting the adhesive strength to 91.0 gf or less.

An optical fiber cable according to one or more embodiments of the present invention includes the optical fiber unit and a sheath that covers the optical fiber unit.

In one or more embodiments, the binding materials are wound around a plurality of optical fibers in an SZ shape, and the binding state of the binding material is stable. Therefore, discrimination of the optical fiber unit is secured while suppressing the bundle of optical fibers from becoming loose, and it is possible to improve workability of intermediate post-branching or the like of the optical fiber cable.

According to the above embodiments of the present invention, it is possible to stabilize the binding state of a binding material wound around a plurality of optical fibers in an SZ shape.

BRIEF DESCRIPTION OF DRAWINGS

FIG. 3A is a side view of a binding device viewed in a radial direction according to one or more embodiments.

DETAILED DESCRIPTION

Figure 1:
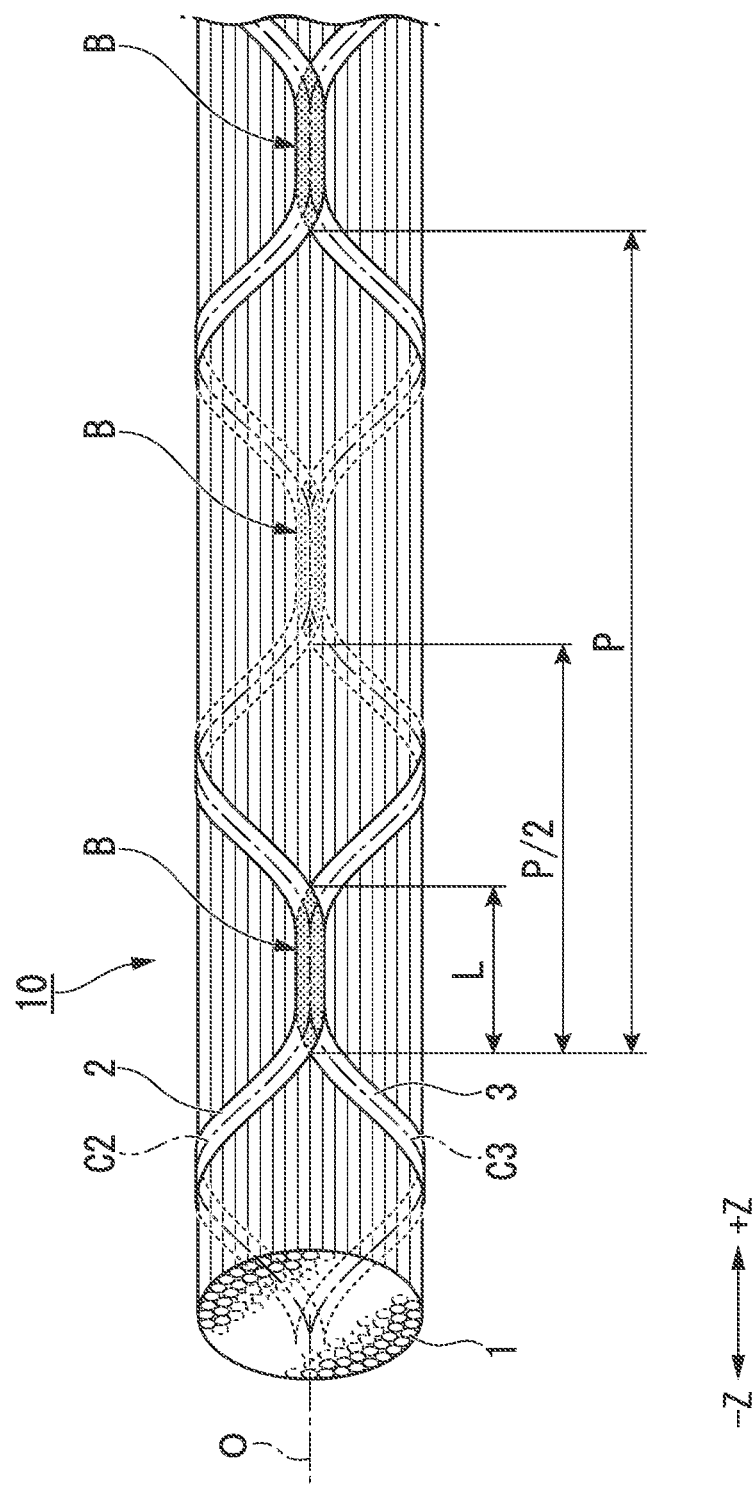
FIG. 1 is a schematic diagram showing the configuration of an optical fiber unit according to one or more embodiments.

The configuration of the optical fiber unit according to embodiments of the present invention will be described below with reference to FIGS. 1 to 5B.

In the drawings used in the following description, in order to make the invention easier to understand, illustration of each component may be omitted, the scale may be changed, and the shape is simplified, in some cases.

As shown in FIG. 1, an optical fiber unit 10 includes a plurality of optical fibers 1, and two binding materials 2, 3 binding the plurality of optical fibers 1.

Direction Definition

As shown in FIG. 1, a plurality of optical fibers 1 is bundled into a cylinder shape as a whole. In one or more embodiments, the center axis of the cylinder is referred to as a central axis O. Further, a direction in which the optical fiber unit 10 extends, that is, a direction along the central axis O is referred to as a longitudinal direction. The Z axis in FIG. 1, FIG. 3A, FIG. 4A, FIG. 4B, FIG. 5A, and FIG. 5B indicates the longitudinal direction. Further, in a front view as viewed from the longitudinal direction, a direction intersecting the central axis O is referred to as a radial direction, and a direction revolving around the central axis O is referred to as a circumferential direction.

The plurality of optical fibers 1 may be bundled into a columnar shape having a non-circular (elliptical, square, or the like) cross section, or the cross sectional shape thereof may be changed in the longitudinal direction. In this case, an imaginary line connecting the centroid of the section of the optical fiber unit 10 in the longitudinal direction is defined as the central axis O.

As the plurality of optical fibers 1, for example, one obtained by bundling a plurality of 12-core intermittent adhesive optical fiber tape cores can be used.

The binding materials 2, 3 are formed in a band shape. As the binding materials 2, 3, for example, a material obtained by combining a plurality of fibers made of a high melting point material such as polyethylene terephthalate (PET) or a low melting point material such as polypropylene (PP) can be used. The configuration and material of the binding materials 2, 3 are not limited to those described above, and can be appropriately changed.

The binding materials 2, 3 are wound around the plurality of optical fibers 1 in an SZ shape, and are adhered to each other at respective reversed portions to form an adhesive part B. The binding materials 2, 3 are thermally fused to each other at an adhesive part B by a binding device 20 which will be described later. There are cases where a plurality of optical fiber units 10 are disposed in the optical fiber cable.

In order to discriminate among the plurality of optical fiber units 10 in the optical fiber cable, the binding materials 2, 3 may be colored differently.

Figure 2:
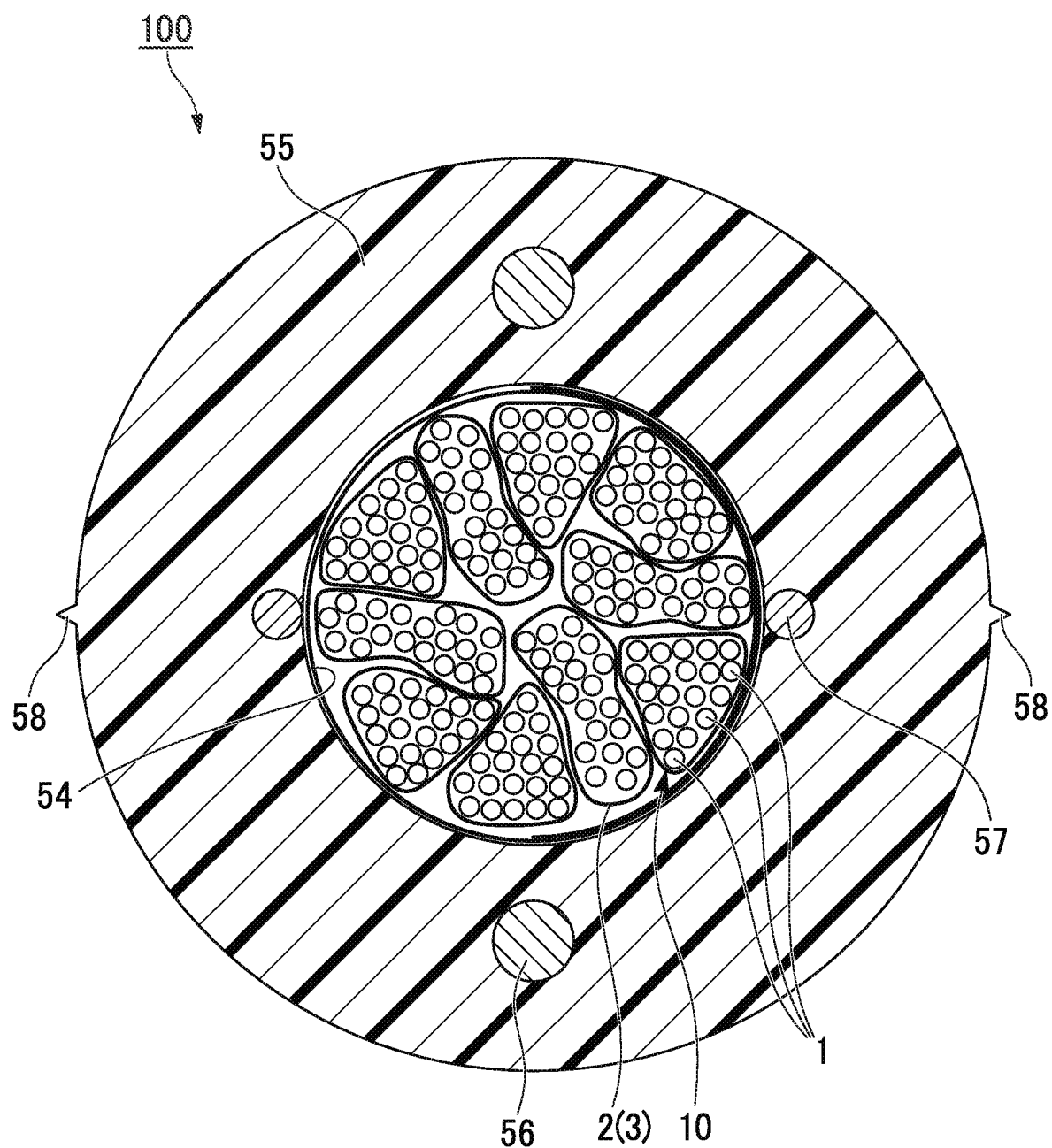
FIG. 2 is a sectional view showing the configuration of an optical fiber cable including the optical fiber unit in FIG. 1.

The optical fiber unit 10 is used by being accommodated in an optical fiber cable 100 as shown in FIG. 2, for example.

The optical fiber cable 100 includes a plurality of optical fiber units 10, a wrapping tube 54, a cylindrical sheath 55, a pair of strength members 56, and a pair of rip cords 57.

The wrapping tube 54 covers the plurality of optical fiber units 10. The sheath 55 covers the optical fiber unit 10 together with the wrapping tube 54. The pair of strength members 56 is buried in the sheath 55. The pair of rip cords 57 is buried in the sheath 55. The pair of rip cords 57 is disposed in a position close to the inner peripheral surface of the sheath 55. Marker protrusions 58 are protruded from the outer peripheral surface of the sheath 55, on the radially outer side at the positions where the pair of rip cords 57 are disposed. The marker protrusion 58 is formed along the rip cord 57 and indicates the buried position of the rip cord 57. The optical fiber cable 100 may not include the wrapping tube 54, the strength member 56, the rip cord 57, and the marker protrusion 58. Further, the optical fiber cable 100 may have only one optical fiber unit 10.

Next, a method of manufacturing the optical fiber unit 10 shown in FIG. 1 will be described.

Figure 3B:
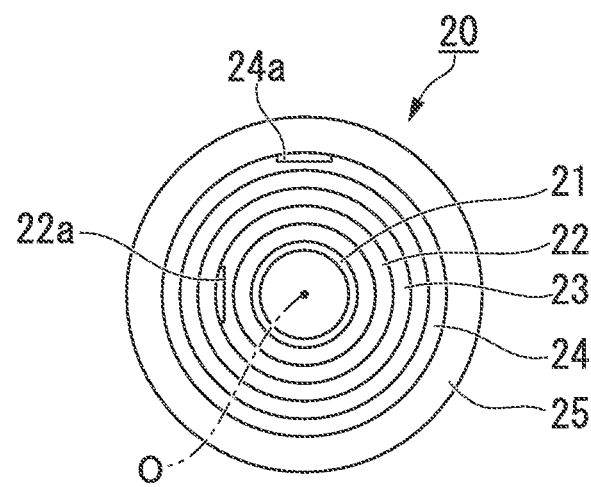
FIG. 3B is a view in a direction of arrow A in FIG. 3A.

The optical fiber unit 10 is formed by winding the binding materials 2, 3 around a plurality of optical fibers 1, by using the binding device 20 as shown in FIGS. 3A and 3B.

FIG. 3A is a side view of the binding device 20 as viewed from a direction orthogonal to the longitudinal direction, and FIG. 3B is a view in the direction of arrow A in FIG. 3A.

As shown in FIGS. 3A and 3B, the binding device 20 is configured with a plurality of cylindrical members. The binding device 20 includes a guide cylinder 21, a first inner cylinder 22, a first outer cylinder 23, a second inner cylinder 24, and a second outer cylinder 25 in order from the inside. These members are disposed in a state where their center axes are located on the central axis O. The plurality of optical fibers 1 are inserted into the guide cylinder 21.

The first inner cylinder 22 is fitted in the first outer cylinder 23, in a state of being rotatable around the central axis O with respect to the first outer cylinder 23. A groove portion 22a extending over the entire length in the longitudinal direction is formed on the outer peripheral surface of the first inner cylinder 22. The binding material 2 is inserted into the groove portion 22a.

The second inner cylinder 24 is fitted in the second outer cylinder 25 in a state of being rotatable around the central axis O with respect to the second outer cylinder 25. A groove portion 24a extending over the entire length in the longitudinal direction is formed on the outer peripheral surface of the second inner cylinder 24. The binding material 3 is inserted into the groove portion 24a.

The first inner cylinder 22 and the second inner cylinder 24 are connected to a common power source (not shown) and configured to rotate around the central axis O in association with the supply of power. When forming the optical fiber unit 10, as the plurality of optical fibers 1 pass through the guide cylinder 21 and are drawn out to the downstream side, the binding materials 2, 3 in the groove portions 22a, 24a are wound around the plurality of optical fibers 1 in an SZ shape. Since the binding materials 2, 3 are heated and partially melted in the groove portions 22a, 24a, the binding materials 2, 3 are thermally fused to each other in the reversed portions of the SZ shape.

The binding materials 2, 3 may not be heated in the groove portions 22a, 24a but may be heated in a heating die (not shown) disposed downstream of the binding device 20. In this case, the binding materials 2, 3 exit the binding device 20 in a state where the binding materials 2, 3 are wound around the plurality of optical fibers 1 in the SZ shape, and then, are thermally fused to each other in the heating die.

Next, a specific example of the optical fiber unit 10 of one or more embodiments will be described.

In FIG. 1, C2 is the center line of the binding material 2, and C3 is the center line of the binding material 3. As shown in FIG. 1, the center lines C2, C3 each have a linear portion extending in the longitudinal direction and a curved portion connecting the linear portions. The linear portions of the center lines C2, C3 are included in an adhesive part B, whereby the adhesive part B extends as a whole along the longitudinal direction. In one or more embodiments, when viewed from the radially outer side of the adhesive part B, the linear portions of the center lines C2, C3 overlap each other at the adhesive part B.

Hereinafter, the length of the adhesive part B in the longitudinal direction is referred to as an adhesion length L. Further, as shown in FIG. 1, the pitch of binding in the longitudinal direction of the binding materials 2, 3 wound in the SZ shape is referred to as a binding pitch P. The binding pitch P is a unit in which the shapes of the binding materials 2, 3 are repeated in the longitudinal direction.

A plurality of optical fiber units 10 is prepared using the adhesion length L and the binding pitch P as parameters, and the strength and the like of the adhesive part is measured, and the results are shown in Table 1.

there is no linear portion in the center lines of the binding materials 2, 3, and the center lines C2, C3 of the binding materials 2, 3 are crossed at one point. The center lines C2, C3 of the respective binding materials 2, 3 cross each other at one point, and the adhesion length L is 8 [mm] because the respective binding materials 2, 3 have a width of 1 [mm]. On the other hand, for example, in Example 2, the center lines C2, C3 of the binding materials 2, 3 have linear portions of 10 [mm], so the adhesion length L is 18 [mm] longer by 10 [mm] than in the comparative example.

L/P shown in Table 1 is a value obtained by dividing the adhesion length L [mm] by a binding pitch P [mm]. For example, in Example 2, the adhesion length L=18 [mm] and the binding pitch P=150 [mm], so L/P=18/150=0.12.

L/(P/2) shown in Table 1 indicates the ratio of the length of the adhesive part B to the length of the optical fiber unit 10 in the longitudinal direction. To explain in detail, in a case where there are two binding materials, two adhesive parts B are present per binding pitch P as shown in FIG. 1. Therefore, the numerical value obtained by dividing the adhesion length L by P/2 is a ratio of the length of the adhesive part B to the length of the optical fiber unit 10 in the longitudinal direction. For example, in Example 2, it is established that L/(P/2)=18/(150/2)=0.24.

The adhesive strength [gf] shown in Table 1 is a peak value of tensile force when the binding materials 2, 3 are pulled apart in the circumferential direction at a speed of 200 [mm/min] in the adhesive part B, and the adhesive part B is peeled off.

TABLE 1

| Binding method | Comparative Example | Example 1 | Example 2 | Example 3 | Example 4 | Example 5 | Example 6 | Example 7 | Example 8 | Example 9 |
|---|---|---|---|---|---|---|---|---|---|---|
| Number of binding materials | 2 | 2 | 2 | 2 | 2 | 2 | 2 | 2 | 2 | 4 |
| Binding pitch P (mm) | 150 | 150 | 150 | 150 | 150 | 150 | 150 | 50 | 300 | 150 |
| Adhesion length L (mm) | 8 | 11 | 18 | 36 | 50 | 60 | 70 | 16 | 100 | 50 |
| L/P | 0.05 | 0.07 | 0.12 | 0.24 | 0.33 | 0.40 | 0.47 | 0.32 | 0.33 | 0.33 |
| L/(P/2) | 0.11 | 0.15 | 0.24 | 0.48 | 0.67 | 0.80 | 0.93 | 0.64 | 0.67 | 0.67 |
| Adhesive strength (gf) | 4.0 | 12.5 | 31.0 | 62.5 | 76.0 | 86.6 | 91.0 | 24.5 | 102.1 | 72.3 |
| Post-cabling loss (dB/km) | 0.20 | 0.20 | 0.21 | 0.22 | 0.22 | 0.23 | 0.26 | 0.23 | 0.21 | 0.22 |
| Number (pcs) of destroyed adhesive parts per 3 m | 40 | 15 | 0 | 0 | 0 | 0 | 0 | 0 | 0 | 0 |
| Probability (%) of destroyed adhesive parts per 3 m | 100.0 | 37.5 | 0.0 | 0.0 | 0.0 | 0.0 | 0.0 | 0.0 | 0.0 | 0 |

In the optical fiber unit of a comparative example and Example 1 to 8 shown in Table 1, six pieces of 12-core intermittent adhesive optical fiber tape cores are used as the plurality of optical fibers 1. Further, two binding materials 2, 3 are wound around six intermittent adhesive optical fiber tape cores in an SZ shape, the reversed portions of the binding materials 2, 3 are thermally fused to each other to form an adhesive part B. In the comparative example and Examples 1 to 8, binding materials 2, 3 formed by combining a plurality of fibers including PET and PP and having a width of 1 [mm] are used.

In the comparative example shown in Table 1, the binding materials 2, 3 are thermally fused to each other such that The post-cabling loss [dB/km] shown in Table 1 is the result of generating an optical fiber cable 100 as shown in FIG. 2, and measuring the maximum value of the transmission loss of the optical fiber 1 at the measurement wavelength of 1.55 [μm], by using the optical fiber unit 10 in the comparative example and Examples 1 to 9.

When the optical fiber unit 10 is taken out of the optical fiber cable 100, the number of destroyed adhesive parts B (peeling or adhesion failure) per 3 [m] and the probability [%] thereof are shown in Table 1. For example, in a case where two binding materials are used and the binding pitch P is 150 [mm], the adhesive part B is included at a rate of one in 75 [μm], so the optical fiber unit of 3 [m] includes 3000÷75=40 adhesive parts B. In a comparative example, since the destruction is checked for all of the 40 adhesive parts B, the probability of the destruction of the adhesive part B per 3 [m] is 100 [%].

In Example 1, the number of destroyed adhesive parts B per 3 [m] is greatly reduced to 15 from 40, in comparison with the comparative example. This is because the adhesion length L is increased from 8 [mm] to 11 [mm], by the fact that the center lines C2, C3 of Example 1 have linear portion of 3 [mm], in comparison with the comparative example. More specifically, since the value of L/(P/2) indicating the ratio of the adhesive part B increases from 0.11 to 0.15, the adhesive strength is improved from 4.0 [gf] to 12.5 [gf], and the adhesive part B is hardly broken.

As described above, by setting the value of L/(P/2) to 0.15 or more and the adhesive strength to 12.5 [gf] or more, the probability of destruction of the adhesive part B can be reduced.

Next, consider the optimum numerical range of L/(P/2).

In Examples 2 to 8, the number of destroyed adhesive parts B per 3 [m] is zero in all of them. The larger the value of L/(P/2) is, the larger the ratio of the adhesive part B to the binding materials 2, 3, it is considered that the adhesive part B is hardly broken. The minimum value of L/(P/2) in Example 2 to 8 is 0.24 of Example 2. From the result, the value of L/(P/2) optimum for preventing the destruction of the adhesive part B is a range shown by the following Expression (1).

$$0.24 \leq L/(P/2) \qquad (1)$$

On the other hand, in a case where the value of L/(P/2) is large, when the binding materials 2, 3 are wound around the plurality of optical fibers 1 in an SZ shape, the distance in the longitudinal direction or time from the formation of the adhesive part B to the inversion of the binding materials 2, 3 is shortened. Therefore, adhesion failure in the adhesive part B of the binding materials 2, 3 is likely to occur. Thus, as L/(P/2) may be set to a value that is small to some extent.

For example, in the example shown in Table 1, in Example 6 in which the value of L/(P/2) is 0.93, the adhesion failure of the binding materials 2, 3 is likely to occur. Further, the next largest value of L/(P/2) after Example 5 is 0.80 of Example 5, but the adhesive part B can be normally formed for Example 5. Therefore, the value of L/(P/2) may be in a range shown by the following Expression (2).

$$L/(P/2) \leq 0.8 \qquad (2)$$

From the above considerations and Expressions (1), (2), it can be said that it is optimal to set the value of L/(P/2) to the range shown in the following Expression (3).

$$0.24 \leq L/(P/2) \leq 0.8 \qquad (3)$$

Next, consider the optimum numerical range of adhesive strength.

In Examples 2 to 8, the number of destroyed adhesive parts B per 3 [m] is zero in all of them. The larger the adhesive strength is, the harder the adhesive part B is to be broken. The minimum value of adhesive strength in Example 2 to 8 is 24.5 [gf] of Example 7. From the result, the value of the adhesive strength optimum for preventing the destruction of the adhesive part B is 24.5 [gf] or more.

On the other hand, in a case where the value of the adhesive strength is excessively large, it is difficult to separate the binding materials 2, 3 at the adhesive part B, so it is difficult to perform the intermediate post-branching. The optical fiber unit 10 is taken out from the optical fiber cable 100 of each of Examples 1 to 8 and the workability when the binding materials 2, 3 are peeled at the adhesive part B is checked. As a result, the workability for Example 8 in which the adhesive strength is the largest at 102.1 [gf] is lowered. In Example 6 having the next largest adhesive strength 91.0 [gf] after Example 8, the binding materials 2, 3 at the adhesive part B are easily peeled off, and there is no decrease in workability. From this result, an adhesive strength optimum for preventing deterioration of workability when peeling off the adhesive part B is 91.0 gf or less.

Accordingly, for facilitating the peeling work of the binding materials 2, 3 in the adhesive part B while preventing the adhesive part B from being unexpectedly broken, the adhesive strength may be 12.5 gf or more and 91.0 gf or less.

The optimum values of L/(P/2) and adhesive strength merely show examples of one or more embodiments of the present invention, and the technical scope of the present invention is not limited to the range of this numerical value.

As described above, according to the optical fiber unit 10 of one or more embodiments, at least two binding materials 2, 3 are wound around the plurality of optical fibers 1 in an SZ shape. An adhesive part B, in which the reversed portions of the binding materials 2, 3 are adhered to each other, extends in the longitudinal direction. The adhesive area of the adhesive part B is secured, the adhesive strength is improved, and the adhesive part B can be easily formed at the time of manufacturing the optical fiber unit 10. Accordingly, it is possible to stabilize the binding state of the binding materials 2, 3.

In addition, since the center lines C2, C3 of the binding materials 2, 3 have linear portions extending along the longitudinal direction and the linear portion is included in the adhesive part B, it is possible to more reliably form the adhesive part B, for example, as compared with the case where the center lines C2, C3 of the binding materials 2, 3 do not have linear portions.

In addition, since the respective linear portions in the center lines C2, C3 of the binding materials 2, 3 overlap each other at the adhesive part B, the area of the adhesive part B is increased, and the binding materials 2, 3 can be adhered more reliably.

Further, in a case where the optical fiber unit 10 is configured so as to satisfy 0.15≤L/(P/2)≤0.8, the area of the adhesive part B occupied in the entire binding materials 2, 3 is secured, and thus it is possible to prevent the adhesive part B from being unexpectedly peeled off, and it is possible to prevent occurrence of adhesion failure of the binding materials 2, 3 at the time of manufacturing.

In the case where the optical fiber unit 10 is configured such that the adhesive strength of the adhesive part B is 12.5 gf or more and 91.0 gf or less, the adhesive strength is secured to prevent the adhesive part B from being unexpectedly peeled off, and it is possible to improve the workability when the binding materials 2, 3 are peeled off at the adhesive part B.

Further, according to the optical fiber cable 100 of one or more embodiments, the binding materials 2, 3 are wound around the plurality of optical fibers 1 in the SZ shape, and the binding state of the binding materials 2, 3 is stable. With this configuration, discrimination of the optical fiber unit 10 is secured while suppressing the bundle of optical fibers 1 from becoming loose, and it is possible to improve workability of intermediate post-branching or the like of the optical fiber cable 100.

It should be noted that the technical scope of the present invention is not limited to the above-described embodiments, and various modifications can be made without departing from the spirit of the present invention.

For example, in one or more embodiments, the binding materials 2, 3 are thermally fused to each other to form the adhesive part B, but the present invention is not limited thereto. For example, the adhesive part B may be formed by adhering the binding materials 2, 3 with an adhesive bond.

Figure 4A:
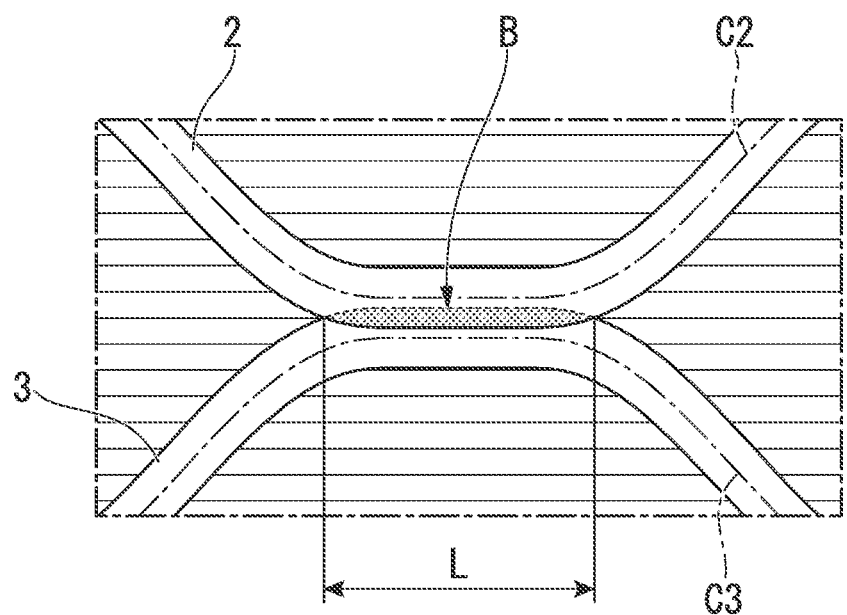
FIG. 4A is an enlarged view of an adhesive part in a state where the center lines of the binding materials are spaced apart in a circumferential direction according to one or more embodiments.

In one or more embodiments described above, the linear portions of the center lines C2, C3 of the binding materials 2, 3 overlap each other at the adhesive part B, but the present invention is not limited thereto. For example, as shown in FIG. 4A, the center lines C2, C3 of the binding materials 2, 3 are spaced apart in the circumferential direction, and the linear portions of the center lines C2, C3 may not overlap each other. In this case, the linear portions of the center lines C2, C3 may not be included in the adhesive part B or may be included in the adhesive part B.

Figure 4B:
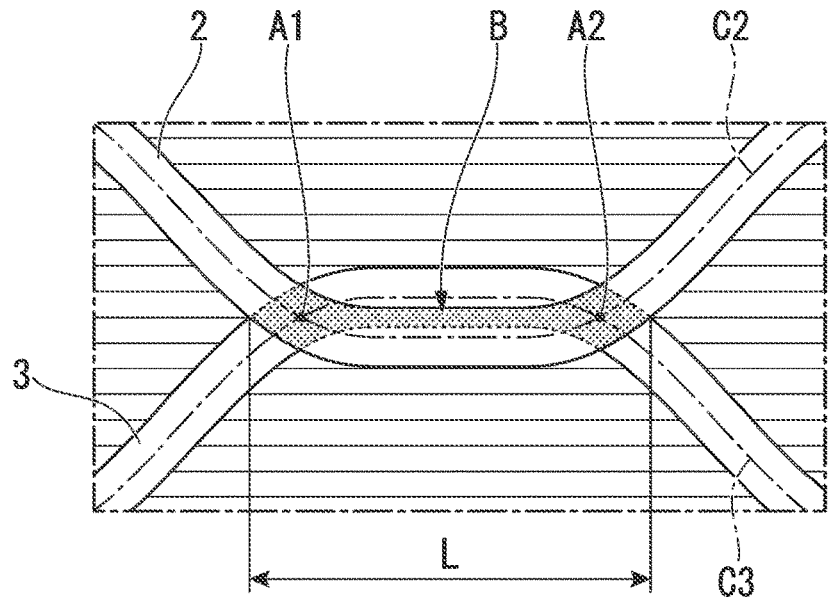
FIG. 4B is an enlarged view of the adhesive part in a state where the center lines of the binding materials intersect each other according to one or more embodiments.

Alternatively, as shown in FIG. 4B, the center lines C2, C3 may intersect when the adhesive part B is viewed from the radially outer side. In FIG. 4B, the center lines C2, C3 intersect each other at the reversed portions of the binding materials 2, 3 to form a plurality of intersection points. More specifically, the linear portions of the center lines C2, C3 are spaced apart from each other in the circumferential direction, and the curved portions of the center lines C2, C3 intersect at both end portions of the linear portions in the longitudinal direction. In the case where the center lines C2, C3 intersect each other as shown in FIG. 4B, the center lines C2, C3 form two intersection points A1, A2, and the adhesive part B can be formed around the two intersection points A1, A2. Thus, even in a case where there is a variation in the positions where the binding materials 2, 3 are reversed or the shapes of the reversed portions, the adhesive part B is reliably formed, so it is possible to stabilize the binding state of the binding materials 2, 3. In this case, the linear portions of the center lines C2, C3 may not be included in the adhesive part B or may be included in the adhesive part B.

Figure 5A:
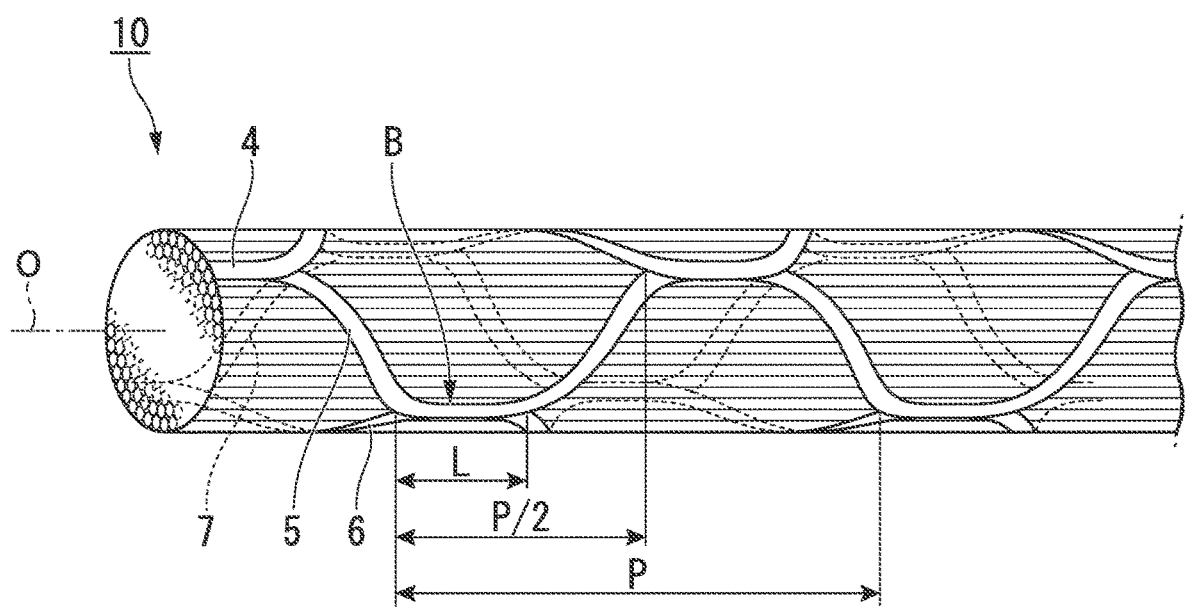
FIG. 5A is a schematic diagram showing the configuration of an optical fiber unit of a modification example according to one or more embodiments.
Figure 5B:
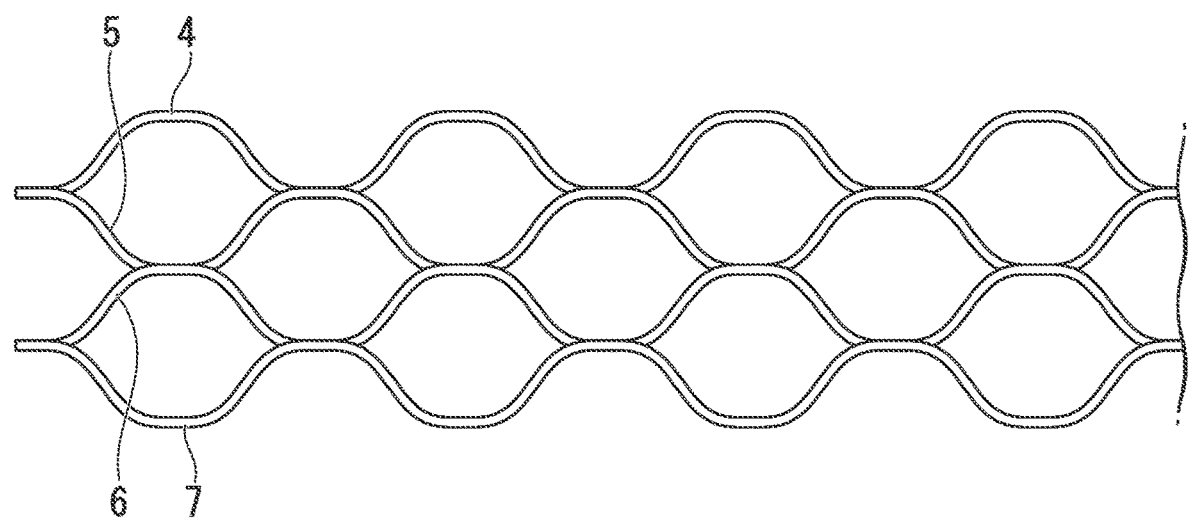
FIG. 5B is a developed view of the binding materials of FIG. 5A.

In one or more embodiments described above, the optical fiber unit 10 is provided with the two binding materials 2, 3, but the present invention is not limited thereto, and may adopt the optical fiber unit 10 having three or more binding materials. For example, FIG. 5A shows a case where four binding materials 4, 5, 6, 7 are wound around a plurality of optical fibers 1 in an SZ shape. When the binding materials 4, 5, 6, 7 in FIG. 5A are developed in a plane, FIG. 5B is obtained. In Example 9 shown in Table 1, as shown in FIG. 5A, an optical fiber unit 10 having four binding materials 4, 5, 6, 7 is prepared.

As shown in FIG. 5A, even in a case where more than two binding materials are wound in the SZ shape, the adhesion length L and the binding pitch P are defined similarly as in the case of two binding materials. Therefore, even in a case where three or more binding materials are wound in the SZ shape, the optical fiber unit 10 is configured so as to satisfy $0.15 \leq L/(P/2) \leq 0.8$, so it is possible to prevent the adhesive part B from being unintentionally peeled off, and it is possible to prevent occurrence of adhesion failure of the binding materials 2, 3 at the time of manufacturing.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF THE REFERENCE SYMBOLS

1: optical fiber
10: optical fiber unit
2, 3: binding material
100: optical fiber cable
C2, C3: center line
L: adhesion length
O: central axis
P: binding pitch

The invention claimed is:

1. An optical fiber unit comprising:
a plurality of optical fibers; and
two binding materials that bind the plurality of optical fibers, wherein
the two binding materials are:
  wound around the plurality of optical fibers in an SZ shape, and
  adhered to each other at reversed portions of the SZ shape to form an adhesive part,
the adhesive part extends along a longitudinal direction along which the optical fiber unit extends,
$0.15 \leq L/(P/2) \leq 0.8$ is satisfied, where
  L is a length of the adhesive part in the longitudinal direction, and
  P is a binding pitch of the two binding materials in the longitudinal direction,
a center line of each of the two binding materials has a linear portion that extends along the longitudinal direction and that is included in the adhesive part, and
the linear portions of the center lines of the two binding materials overlap each other in the adhesive part when viewed from a radial direction of a central axis of the optical fiber unit.

2. The optical fiber unit according to claim 1, wherein an adhesive strength of the adhesive part is greater than or equal to 12.5 gf and less than or equal to 91.0 gf.

3. An optical fiber cable comprising:
the optical fiber unit according to claim 1, and
a sheath that covers the optical fiber unit.

4. An optical fiber unit, comprising:
a plurality of optical fibers; and
two binding materials that bind the plurality of optical fibers, wherein
the two binding materials are:
  wound around the plurality of optical fibers in an SZ shape, and
  adhered to each other at reversed portions of the SZ shape to form an adhesive part,
the adhesive part extends along a longitudinal direction along which the optical fiber unit extends,
$0.15 \leq L/(P/2) \leq 0.8$ is satisfied, where
  L is a length of the adhesive part in the longitudinal direction, and
  P is a binding pitch of the two binding materials in the longitudinal direction,
a center line of each of the two binding materials has a linear portion that extends along the longitudinal direction and that is included in the adhesive part,
the center lines of the two binding materials intersect each other at ends of each reversed portion to form a plurality of intersection points in each reversed portion when viewed from a radial direction of a central axis of the optical fiber unit, and the center lines of the two binding materials are spaced apart from each other in a circumferential direction of the optical fiber unit between the intersection points of each reversed portion.

* * * * *